United States Patent Office 3,126,361
Patented Mar. 24, 1964

3,126,361
PROCESS FOR THE PRODUCTION OF THERMO-STABLE ACRYLONITRILE POLYMERS HAVING AN IMPROVED DYEING CAPACITY
Dietrich Glabisch, Leverkusen, Wilhelm Becker, Cologne-Stammheim, and Ingofroh Dennstedt, Cologne-Buchforst, Germany, assignors to Farbenfabriken Bayer Aktiengesellschaft, Leverkusen, Germany, a corporation of Germany
No Drawing. Filed Aug. 25, 1959, Ser. No. 835,845
Claims priority, application Germany Aug. 30, 1958
6 Claims. (Cl. 260—78)

The present invention relates to novel copolymers of acrylonitrile with novel and valuable qualities and is more particularly concerned with a process for the production of thermostable acrylonitrile polymers having an improvement dyeing capacity.

Acrylonitrile polymers or copolymers are of great technical importance, especially in the form of filaments, textiles, films and foils. However, these products have the disadvantage that they are difficult to dye or colour. It has already been proposed that unsaturated compounds should be incorporated into the polymerisation mixture, so that an improved dyeing capacity is produced with acid dyestuffs. However, the copolymers thus obtained are discoloured to an exceptionally high degree when they are exposed to relatively high temperatures. On the other hand, it has also been proposed to incorporate unsaturated acids, such as acrylic acid or methacrylic acid, during the polymerisation reaction, so that an improved dyeing capacity is produced with basic dyestuffs. However, these products show a greatly reduced thermostability.

It is an object of the present invention to provide novel copolymers of acrylonitrile with valuable qualities. Another object of the invention is to provide copolymers of acrylonitrile which are thermostable and which have an improved dyeing capacity. Another object is to provide a process for the production of these new copolymers of acrylonitrile. A further object of the invention is to use carboxyl group-containing compounds as comonomers, whereby the acrylonitrile polymers obtained become thermostable and receive an improved dyeing capacity. Still further objects will become apparent hereinafter.

It has now been found that thermally stable acrylonitrile polymers, which can be dyed satisfactorily with basic dyestuffs, are obtained if acrylonitrile is copolymerised with those unsaturated carboxyl group-containing compounds in which the carboxyl group is separated from the carbon-carbon double bond by at least four carbon or hetero atoms. Especially suitable for the copolymerisation are those unsaturated carboxyl group-containing compounds, in which one or preferably several acid amide groupings are present in the molecule.

If the carbon-carbon double bond is activated by certain groups, these substances can be copolymerised with acrylonitrile in a particularly simple manner. These activating groups include for example halogen atoms or groups with multiple bonds, such as those existing in the CO-grouping or CN-grouping or in aromatic ring systems.

The carboxyl group must be separated from the carbon-carbon double bond by at least four carbon or hetero atoms, the latter being understood as meaning oxygen, nitrogen and sulphur atoms.

Examples of suitable unsaturated compounds containing carboxyl groups are: esters produced by reacting acrylic, methacrylic or crotonic acids (or their chlorides or anhydrides) with hydroxy carboxylic acids, such as β-hydroxypropionic acid, salicylic or p-hydroxybenzoic acid. In this way, there are obtained for example acryloyl-salicylic acid, methacryloylsalicylic acid, acryloyl-p-hydroxybenzoic acid, methacryloyl-p-hydroxybenzoic acid and methacryloyl-β-hydroxypropionic acid. Also suitable are acryloyl and methacryloyl-ε-hydroxy-caproic acids as well as acryloyl and methacryloyl-ε-hydroxy-butyric acids.

Also to be mentioned are acid amides, prepared by reaction of acrylic acid, methacrylic acid or crotonic acid (or their chlorides) with β-aminopropionic acid, γ-aminobutyric acid, ε-aminocaproic acid or p-aminobenzoic acid.

Particularly good results are produced with those unsaturated compounds which contain carboxyl groups and which include several acid amide groupings. They may be obtained by reaction of unsaturated acids or acid derivatives with peptides. Examples of compounds of this class which are suitable for use in accordance with the invention are the following: N(N-methacryloyl-ε-aminocaproyl)-ε-aminocaproic acid, N-(N-methacryloyl-ε-aminocaproyl glycine, N-(N-acryloyl-ε-aminocaproyl)-ε-aminocaproic acid, N-(N-acryloyl-ε-aminocaproyl)glycine, N-(N-methacryloglycyl) - glycine, N-(N-methacryloyl-glycylalanyl) - glycine and N-(N-acrylo-aminocaproyl) glycyl-glycine. Practically all unsaturated amide acids have the advantage of being substantially soluble in water and are consequently especially suitable for polymerisation in an aqueous medium.

As other suitable unsaturated acids, there are to be mentioned: the reaction products of unsaturated isocyanate, such as ethyl methacrylate isocyanate, with the corresponding amino or hydroxyl carboxylic acids. In this case, urethanes or urea compounds are formed.

In order to produce a good dyeing capacity with basic dyestuffs, it is sufficient to incorporate small quantities of compounds containing carboxyl groups into the acrylonitrile by polymerisation. The amounts should, as far as possible, not exceed 10% in the polymer, so that the characteristic properties of the pure acrylonitrile polymers are not modified by too large an extent. It is advantageous to use quantities of from 0.5 to 5%. It is also possible to use other unsaturated compounds which can be copolymerised with acrylonitrile in conjunction with the compounds containing carboxyl groups in accordance with the invention. These other compounds may, for example, be acrylic or methacrylic acid esters, styrene, vinyl chloride or vinylidene chloride.

Polymerisation of acrylonitrile with the unsaturated acids can be effected by block polymerisation or by polymerisation in solution or emulsion, the polymerisation being carried out with the usual radical formers. As such, there are to be mentioned radical formers which give off oxygen, such as hydrogen peroxide, the persulphates, peroxides, or the azo catalysts, such as azodiisobutyronitrile.

It is particularly desirable to effect polymerisation in aqueous medium at pH values below 7. The combination of persulphates and sulphur compounds of a low oxidation stage are mainly considered as an activating medium in this case.

The acrylonitrile polymers produced by the process of the present invention have an excellent dyeing capacity with basic dyestuffs and surprisingly are extremely stable to heat. Even temperatures of 160° C. can be withstood by these polymers without any change in colour.

The present invention is further described in the following examples which are illustrative but not limitative thereof.

EXAMPLE 1

280 parts by weight of water and 20 parts by weight of the monomer mixtures, separately indicated below, are put in a vessel from which the air has been displaced by nitrogen. The clear solution is adjusted with sulphuric acid to a pH value of 3, and 0.2 part by weight of potassium persulphate and 0.8 part by weight of sodium pyrosulphite are added at 30° C. After a few minutes, a white polymer starts to separate out. The reaction is completed after 3 hours, the polymer is filtered off by suction, washed and dried at 50° C.

The following monomer mixtures are mentioned by way of example:

(a) 95 parts by weight of acrylonitrile and 5 parts by weight of methyl acrylate,
(b) 95 parts by weight of acrylonitrile, 3 parts by weight of methyl acrylate and 2 parts by weight of N-methacryloylaminoacetic acid,[2]
(c) 95 parts by weight of acrylonitrile, 4.5 parts by weight of methyl acrylate and 0.5 parts by weight of N-methacryloyl-ε-aminocaproic acid,[1]
(d) 95 parts by weight of acrylonitrile, 2.2 parts by weight of methyl acrylate and 2.8 parts by weight of N-methacryloyl-ε-aminocaproic acid,
(e) 95 parts by weight of acrylonitrile and 5 parts by weight of N-methacryloyl-ε-aminocaproic acid.

The thermostability and dyeing capacity were tested in films which were cast from dimethyl formamide solutions of the polymer. To test the thermostability, the film was heated for 3 hours to 160° C. in the presence of air. The dyeing capacity of the films was tested with the basic dyestuff Astrazonblau FGL.

The results are set out in Table I.

*Table I*

| Mixture | | Yield | K-value | Thermostability of film (3 hrs., 160° C.) | Dyeing capacity with Astrazonblau FGL |
|---|---|---|---|---|---|
| (a) | {95 ACN<br>{5 AM | }95 | 89 | film almost colourless. | insufficient. |
| (b) | {95 ACN<br>{3 AM<br>{2 MAE | }93 | 84 | film already shows strong yellow discoloration after 1 hour. | very good. |
| (c) | {95 ACN<br>{4.5 AM<br>{0.5 MAC | }95 | 86 | film almost colorless. | adequate. |
| (d) | {95 ACN<br>{2.2 AM<br>{2.8 MAC | }98 | 86 | almost colourless. | very good. |
| (e) | {95 ACN<br>{5 MAC | }92 | 84 | ----do---- | Do. |

ACN=acrylonitrile; AM=methyl acrylate; MAE=N-methacryloyl-aminoacetic acid; MAC=N-methacryloyl-ε-aminocaproic acid.

It is to be seen from Table I that by adding N-methacryloylaminoacetic acid (in which the carboxyl group is separated by fewer than 4 carbon or hetero atoms from the carbon-carbon double bond) a very good dyeing capacity is certainly obtained, but the thermostability is impaired. On the other hand, by the adequate addition of substances used according to the present invention, an improvement in the dyeing capacity is obtained while maintaining the good thermostability.

EXAMPLE 2

The quantity of potassium persulphate is increased to 0.3 part and the quantity of sodium pyrosulphite is increased to 1.2 parts and using the monomer mixture according to Example 1d, a polymer is obtained which has a low K-value of 75. The dyeing capacity is very good without the thermostability being reduced, as is usually the case with types having low viscosity.

---

[1] The production of N-methacryloyl-ε-aminocaproic acid: 132 parts by weight of ε-aminocaproic acid are dissolved in 650 parts by volume of 2 N-sodium hydroxide. 110 parts by weight of methacrylyl chloride and 650 parts by volume of 2 N-sodium hydroxide are added alternately in portions at −5° C., the mixture being shaken on each occasion until the acid chloride has dissolved. After being acidified to a pH value of 3, the precipitated reaction product is extracted with acetic acid ester. From the organic liquid phase, pure N-methacryloyl-ε-aminocaproic acid is obtained after the solvent being removed. After recrystallising from ether the product melts at 51° C.
*Analysis.*—Calculated: C, 60.05; H, 8.55; N, 7.05. Found: C, 60.29; H, 8.72; N, 7.12.

[2] In analogous manner, it is possible to prepare, from aminoacetic acid, N-methacryloyl-aminoacetic acid with a M.P. of 104° C.
*Analysis.*—Calculated: C, 50.40; H, 6.29; N, 9.80. Found: C, 50.37; H, 6.45; N, 9.80.

EXAMPLE 3

If less water than is necessary for dissolving the monomer mixture is used, the monomer mixture and activator system can be added dropwise to the water at the rate at which the polymer separates out.

The results hereby obtained are set out in Table II.

*Table II*

| Mixture | Reaction conditions | Yield, percent | K-value | Thermostability (3 hrs., 160° C.) | Dyeing capacity with Astrazonblau FGL |
|---|---|---|---|---|---|
| 700 parts by wt. water. | | | | | |
| 0.55 part by wt. potassium persulphate. | pH 3 | | | | |
| 0.16 part by wt. sodium pyrosulfate. | | | | | |
| 95 parts by wt. ACN. | T=30° C. | 86 | 90 | film almost colourless. | very good. |
| 2.2 parts by wt. AM. | | | | | |
| 2.8 parts by wt. MAC. | t=4 hrs. | | | | |

EXAMPLE 4

Preparation of N-(N-methacryloyl-ε-aminocaproyl)-ε-aminocaproic acid: 10 parts by weight of ε-aminocaproyl-ε-aminocaproic acid (M.P.=199 to 201° C.) are dissolved in 50 parts by weight of 1 N-sodium hydroxide. 5 parts by weight of methacrylyl chloride and 50 parts by weight of 1 N-sodium hydroxide are added in portions at a maximum temperature of 0° C. After extracting with ether, 0.05 part by weight of hydroquinone is added. The mixture is then acidified with 2 N-hydrochloric acid and extracted by shaking with acetic acid ester. The organic phase is separated, dried with sodium sulphate and concentrated by evaporation in vacuo. The reaction product is thus separated out in solid form. The compound is soluble in water and can be recrystallised from acetic acid ester (M.P.=67 to 68° C.). It decolourises bromine water and potassium permanganate solution.

*Analysis.*—Calculated: C, 60.75; H, 9.15; N, 9.15. Found: C, 60.90, 60.99; H, 8.71, 8.99; N, 9.01, 9.27.

In the infra-red spectrum of the compound, the following characteristic bands can be detected: O—H 3.0μ; C—H 3.4μ; COOH 5.9μ; CO—NH 6.05 and 6.11μ; C=C 6.2μ.

Polymerisation: 1325 parts by weight of water and 6.5 parts by weight of 1 N-sulphuric acid are placed in a vessel from which the air has been displaced by nitrogen. After heating to 50° C. and while simultaneously stirring, there are successively added:

(1) A mixture of 95 parts by weight of acrylonitrile, 3.5 parts by weight of methyl acrylate and 1.5 parts by weight of N-(N-methacryloyl-ε-aminocapropyl)-ε-aminocaproic acid,
(2) 45 parts by weight of 0.2-molar sodium pyrosulphite solution and
(3) 30 parts by weight of 0.2-molar potassium sulphate solution.

After a few minutes, a pure white polymer starts to precipitate. After 3 hours, the polymer is filtered by suction, successively washed with water and methanol and dried at 50° C. The product is obtained in a 94% yield and has a K-value of 90. Films of this polymer are characterised by clarity and high lustre and can be dyed very satisfactorily with Astrazonblau FGL. The thermostability is very good.

In the manner described above, it is also possible to produce the other co-monomers containing carboxyl groups and used in accordance with the invention.

EXAMPLE 5

If the polymerisation of acrylonitrile is carried out as described in Example 4, but with addition of 1.5 parts by weight of N - (N-methacryloyl-ε-aminocaproyl)-glycine (M.P. 95° C.), which has been prepared from ε-aminocaproyl-glycine (M.P. 216 to 218° C.) in a manner analogous to that for N-(N-methylacryloyl-ε-aminocaproyl)-ε-aminocaproic acid then a product which can be cast to form clear lustrous films which are thermostable and can be dyed very satisfactorily with Astrazonblau FGL is obtained in a yield greater than 90%.

We claim:

1. A film-forming copolymer consisting essentially of a major amount of acrylonitrile and 0.5–10% by weight, based on the weight of the polymer, of an acid selected from the group consisting of N-methacryloyl-ε-aminocaproic acid, N-(N-methacryloyl-ε-aminocaproyl)-ε-aminocaproic acid, and N-(N-methacryloyl-ε-aminocaproyl) glycine.

2. A film-forming copolymer consisting essentially of a major amount of acrylonitrile, 0.5–5% of an unsaturated acid selected from the group consisting of N-methacryloyl-ε-aminocaproic acid, N-(N-methacryloyl-ε-aminocaproyl)-ε-aminocaproic acid, and N-(N-methacryloyl-ε-aminocaproyl) glycine, and between 2 and 5% of a further copolymerizable monomer selected from the group consisting of acrylic acid esters, methacrylic acid esters, styrene, vinyl chloride, and vinylidene chloride, the percentages being in parts by weight of the copolymer.

3. A film-forming copolymer consisting essentially of about 95% by weight acrylonitrile and about 5% of a mixture of monomers consisting of approximately equal parts by weight of methyl acrylate and N-methacryloyl-glycine.

4. A film-forming copolymer consisting essentially of about 95% by weight acrylonitrile and about 5% of a mixture of monomers consisting of approximately equal parts by weight of methyl acrylate and N-methacryloyl-ε-aminocaproic acid.

5. A film-forming copolymer consisting essentially of about 95% by weight acrylonitrile and about 5% of a mixture of monomers consisting of approximately equal parts by weight of methyl acrylate and N-(N-methacryloyl-ε-aminocaproyl)-ε-aminocaproic acid.

6. A film-forming copolymer consisting essentially of about 95% by weight of acrylonitrile and about 5% by weight of N-methacryloyl-ε-aminocaproic acid.

References Cited in the file of this patent

UNITED STATES PATENTS

| | | |
|---|---|---|
| 2,311,548 | Jacobson | Feb. 16, 1943 |
| 2,508,718 | Jones | May 23, 1950 |
| 2,705,228 | Winberg | Mar. 25, 1955 |
| 2,739,949 | Forshey | Mar. 27, 1956 |
| 2,744,130 | Winberg | May 1, 1956 |
| 2,825,714 | Melamed | Mar. 4, 1958 |
| 2,843,573 | Melamed | July 15, 1958 |
| 2,910,445 | Mock et al. | Oct. 27, 1959 |
| 2,911,397 | Janssen et al. | Nov. 3, 1959 |
| 2,934,524 | Phelps et al. | Apr. 26, 1960 |
| 2,958,682 | Schuller et al. | Nov. 1, 1960 |